United States Patent
Doshita et al.

(10) Patent No.: US 6,566,603 B2
(45) Date of Patent: May 20, 2003

(54) HARNESS SLACK ABSORBING STRUCTURE

(75) Inventors: Kenichi Doshita, Shizouka (JP); Hiroshi Watanabe, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/096,941

(22) Filed: Mar. 14, 2002

(65) Prior Publication Data

US 2002/0129963 A1 Sep. 19, 2002

(30) Foreign Application Priority Data

Mar. 16, 2001 (JP) .................................. 2001-076514

(51) Int. Cl.⁷ .................................................. H01B 7/06
(52) U.S. Cl. ....................... 174/72 A; 174/135; 174/48; 174/68.3
(58) Field of Search ............................... 174/72 A, 135, 174/48, 68.3, 69, 99 E; 361/826

(56) References Cited

U.S. PATENT DOCUMENTS

| | | | | |
|---|---|---|---|---|
| 4,974,798 A | * | 12/1990 | Harding et al. ............ | 174/72 A |
| 5,466,036 A | * | 11/1995 | Stroeters et al. .............. | 16/362 |
| 5,877,936 A | * | 3/1999 | Nishitani et al. ............. | 174/69 |
| 5,921,782 A | * | 7/1999 | Yamaguchi et al. ....... | 174/72 A |
| 6,079,764 A | * | 6/2000 | Suzuki et al. ............. | 174/72 A |
| 2001/0052203 A1 | | 12/2001 | Doshita et al. ................ | 49/502 |
| 2002/0014348 A1 | | 2/2002 | Aoki et al. .................... | 174/72 |

FOREIGN PATENT DOCUMENTS

| | | |
|---|---|---|
| EP | 0 855 312 A2 | 7/1998 |
| FR | 2 616 390 | 12/1988 |

* cited by examiner

Primary Examiner—Dean A. Reichard
Assistant Examiner—Jinhee J. Lee
(74) Attorney, Agent, or Firm—Armstrong, Westerman & Hattori, LLP (57) ABSTRACT

A harness slack absorbing structure includes a resilient member 6 in a plate-like shape whose base end is fixed to a protector body 8 by means of a fixing member 7, and a wire harness 4 installed along the resilient member. The resilient member 6 is provided with a cut-out 34, and the fixing member 7 is provided with a slit 43 which is adapted to be engaged with the resilient member 6. An upper end 34a of the cut-out 34 is abutted against a lower end 43b of the slit 43, while the other end 34b of the cut-out is abutted against a base end 42b of the fixing member 7. The cut-out 34 may be provided on either side or both sides of the resilient member 6. The protector body 8 includes an insertion part 16 for receiving the resilient member 6, and the insertion part is provided with a cut-out 30 adapted to be engaged with the fixing member 7. The fixing member is fixed to the protector body by screw means 33, or through thermal deformation of projections which are formed of synthetic resin. The protector body is installed in a sliding door or a vehicle body of an automobile.

6 Claims, 5 Drawing Sheets

HARNESS SLACK ABSORBING STRUCTURE

BACKGROUND OF THE INVENTION

1. Field of the Invention

The present invention relates to a structure for absorbing a slack of a wire harness which is installed in order to supply electric power from a vehicle body to a sliding door or the like in an automobile, and more particularly to the structure for absorbing the harness slack accompanying opening and closing movements of the sliding door, by pressing the wire, harness by means of a plate-like resilient member, wherein fixation of the resilient member can be easily and reliably conducted.

2. Description of the Related Art

Heretofore, various apparatuses have been proposed in order to supply power, signals, etc. to a sliding door which is used in a one boxed car or on a rear seat side in a type of a passenger car, at any time irrespective of opening and closing movements of the sliding door.

Conventionally, a slack of an electric wire accompanying opening and closing movements of the sliding door has been absorbed, for example, by curling the electric wire, or by installing a plurality of electric wires (wire harness) along a pair of link arms so that the pair of the link arms can be bent and stretched with the opening and closing movements of the sliding door.

In case of the one boxed car, the wire harness including a power supply line is installed from the vehicle body side by way of a back of a step or its vicinity, extending from a lower part of the sliding door to an inside of the sliding door, and connected to various functional components in the sliding door, such as a power window motor, speaker, door lock unit, switch unit, etc.

When the sliding door is opened by sliding it backward, the sliding door is slid backward while moving outwardly away from the vehicle body, and a gap is created between the sliding door and the vehicle body. As the door side wire harness moves backward integrally with the sliding door, a large slack will occur in the wire harness with respect to the vehicle body. In order to absorb this slack, there is a need for the aforesaid slack absorbing apparatus. In case where the slack is not absorbed, there may be arisen such a danger that the wire harness may be caught between the sliding door and the vehicle body and damaged when the sliding door is closed.

As the sliding door is closed by sliding it forward, the door side wire harness is moved forward integrally with the sliding door and brought into a tensioned state.

However, in the conventional apparatus as described above, employment of the link arms, for example, would lead to problems such as a complicated structure and a bulky size. It has been concerned that this may incur high component cost and increased number in steps for assembling the apparatus to the sliding door, and that flexibility in arranging the functional components in the sliding door may be limited.

There has been also such an anxiety that, when the sliding door is closed violently, for example, the wire harness is pulled strongly and tends to be disengaged from the slack absorbing apparatus such as the link arms and so on. If the wire harness is disengaged, the slack of the wire harness will not be absorbed, and such an inconvenience that the wire harness may be caught between the sliding door and the vehicle body will occur.

In view of the above described circumstances, the object of the present invention is to provide a harness slack absorbing structure which is simple in structure and can be assembled easily and reliably, and free from such a fear that the wire harness may be disengaged from the slack absorbing structure, even though the sliding door is violently closed.

SUMMARY OF THE INVENTION

In order to achieve the above described object, there is provided, according to a first aspect of the present invention, a harness slack absorbing structure comprising a resilient member in a plate-like shape whose base end is fixed to a mounting part by means of a fixing member, and a wire harness installed along the resilient member, the resilient member being provided with a cut-out, the fixing member being provided with a slit to be engaged with the resilient member, wherein one end of the cut-out is abutted against a lower end of the slit, while the other end of the cut-out is abutted against a base end of the fixing member.

According to a second aspect of the present invention, the cut-out is provided on either side or both sides in a lateral direction of the resilient member.

According to a third aspect of the present invention, the mounting part includes an insertion part for receiving the resilient member, the insertion part being provided with a cut-out to be engaged with the fixing member.

According to a fourth aspect of the present invention, the fixing member is fixed to the mounting part by screw means.

According to a fifth aspect of the present invention, the fixing member is fixed to the mounting part through thermal deformation of projections which are formed of synthetic resin and provided on either of the mounting part and the fixing member.

According to a sixth aspect of the present invention, the mounting part includes a protector for receiving the wire harness in a curved state, the protector being provided in a sliding door or a vehicle body.

According to the first aspect, because the fixing member is fixed to the mounting part in a state where the plate-like resilient member has entered in the slit in the fixing member, the resilient member is held by inner edges of the slit in a direction of its thickness, and can be firmly supported without a backlash against bending force in a direction of the thickness of the resilient member. As the results, there will be no risk of rattle of the resilient member, disengagement of the resilient member from the mounting part, and wear of the mounting part due to repeated bending. Moreover, a length of the cut-out in the resilient member can be shorter by the length of the slit. This will enhance rigidity, bending strength, and tensile strength of the resilient member, and tear or plastic deformation of the resilient member due to the repeated contraction and expansion will be reliably prevented.

Further, abutting the one end of the cut-out against the lower end of the slit will block a movement of the resilient member toward its base end, and abutting the other end of the cut-out against the base end of the fixing member will block a movement of the resilient member toward its distal end in a longitudinal direction. Because the resilient member is fixed in this manner so as not to move in a longitudinal direction, withdrawal of the resilient member when bent or pulled can be reliably prevented. Accordingly, reliable absorption of a slack of the wire harness can be always attained, and an inconvenience such as a bite of the wire harness can be eliminated.

Further, because the harness slack absorbing apparatus is composed of a few components such as the plate-like resilient member and the fixing member, this will contribute to a simple structure, light weight, low cost, and facilitated assembling work.

According to the second aspect, in case where the cut-outs are provided on both sides of the resilient member, the plate-like resilient member can be engaged with the slit in the fixing member, irrespective of a front face and a back face of the resilient member, thus enhancing assembling workability.

According to the third aspect, by inserting the resilient member into the insertion part, the resilient member will be supported in a direction of the thickness resisting the bending force, and firmly held in cooperation with the supporting force of the aforesaid slit. Moreover, by engaging the fixing member with the cut-out in the insertion part in a state where the resilient member is engaged with the slit, the distal end of the fixing member is abutted against the one end of the cut-out in the insertion part, and the base end of the fixing member is abutted against the other end of the cut-out, enabling the resilient member to be firmly held in the insertion part resisting a tensile force in a longitudinal direction.

According to the fourth aspect, the fixing member is firmly fixed to the mounting part by the screw means in a state where the resilient member is held by the fixing member and the fixing member is held by the insertion part. As the results, even though a strong tensile force or bending force is exerted on the resilient member, the resilient member will be reliably prevented from being disengaged from the mounting part, and reliable absorption of a slack of the wire harness can be always attained.

According to the fifth aspect, by thermally deforming the projections made of synthetic resin, the fixing member can be simply and effectively fixed to the mounting part. At the same time, the component cost will be decreased and the fixing structure will be simplified, because the components such as small screws need not be employed.

According to the sixth aspect, the insertion part, the fixing member and the resilient member can be safely protected inside the protector from interference with the exterior. Moreover, a slack of the wire harness occurring with opening and closing movements of the sliding door can be absorbed by the resilient member inside the protector, and a catch of the wire harness between the sliding door and the vehicle body and accompanying damage of the wire harness will be prevented.

DESCRIPTION OF THE PREFERRED EMBODIMENTS

Now, preferred embodiments of the present invention will be described in detail referring to the attached drawings.

A harness slack absorbing apparatus 1 is mounted on an inner panel 3 of a sliding door 2, and includes a protector 5 made of synthetic resin and containing a door side wire harness 4 in a curved state, a leaf spring 6 which is a plate-like resilient member provided inside the protector 5 for upwardly pressing the wire harness 4, and a fixing member 7 for fixing a base end of the resilient member 6 to the protector 5. The fixing member 7 constitutes an essential part of the present invention.

Figure 1:
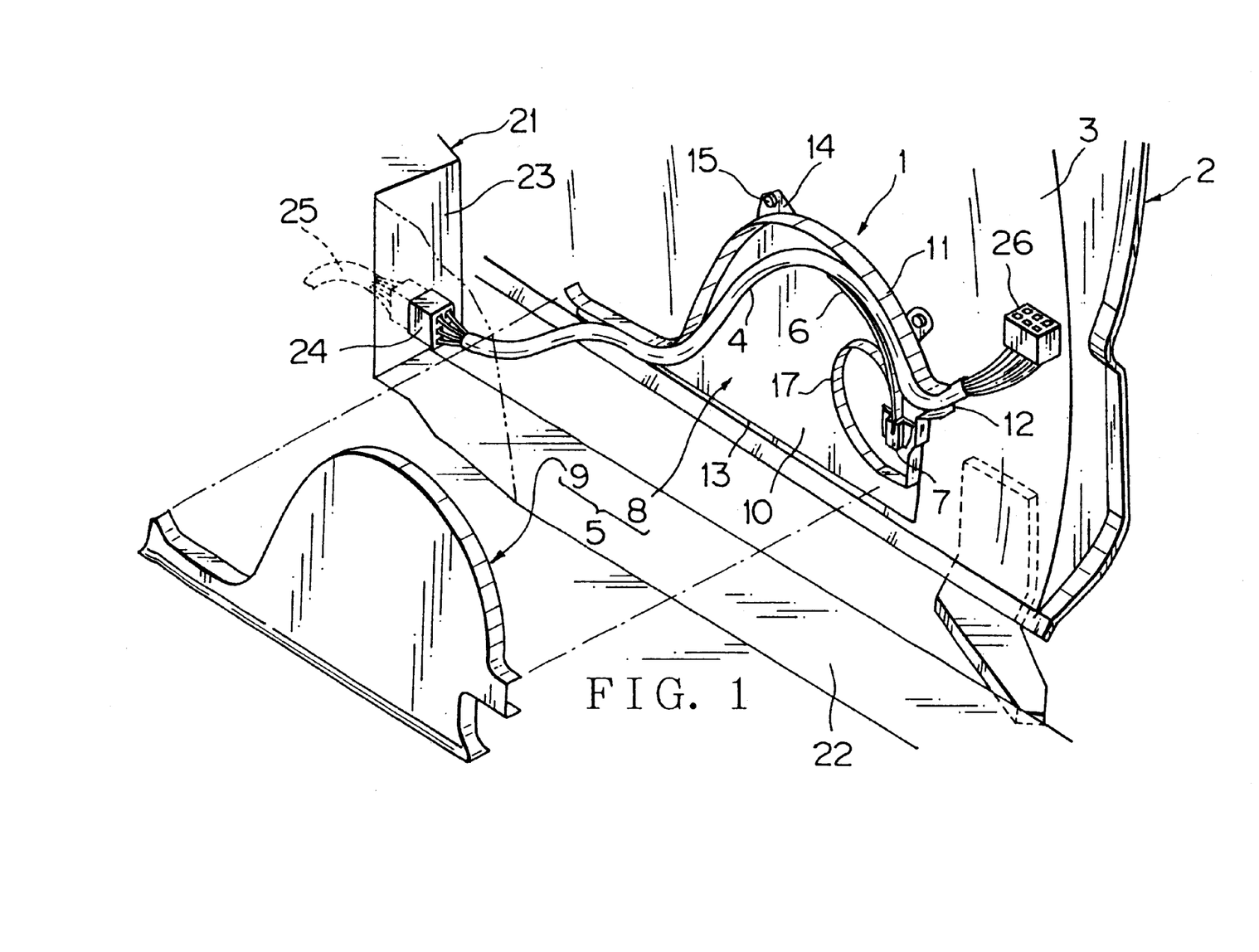
FIG. 1 is an exploded perspective view showing an embodiment of a harness slack absorbing apparatus including a harness slack absorbing structure according to the present invention.

The protector 5 is composed of a protector body 8 and a cover 9 as seen in FIG. 1. The cover 9 is detachably mounted on the protector body 8 with locking means which are not shown. The protector body 8 is generally composed of a vertical base plate 10 extending along the inner panel 3, a surrounding wall 11 in a curved shape uprightly provided on an upper and front sides of the base plate 10, a first harness guide outlet 12 provided at a forward end of the surrounding wall 11, and a second harness guide outlet 13 which opens in a longitudinal direction below the surrounding wall 11.

The protector body 8 is fixed to the door panel 3 by means of a bolt 15 passed through an outer bracket 14 as shown in FIG. 1, or by other appropriate means. An insertion part 16 for receiving the resilient member 6 is formed in the base plate 10 (See FIG. 2). A base end of the resilient member 6 is fixed to the insertion part 16 by means of the fixing member 7. While an upper face of the resilient member 6 is pressed to a lower face of the wire harness 4 and the resilient member 6 extends backward along the lower face of the wire harness, the wire harness 4 is curved inside the protector 5 integrally with the resilient member 6. A distal end of the resilient member 6 is positioned under the wire harness 4 near an apex of the curve.

Figure 2:
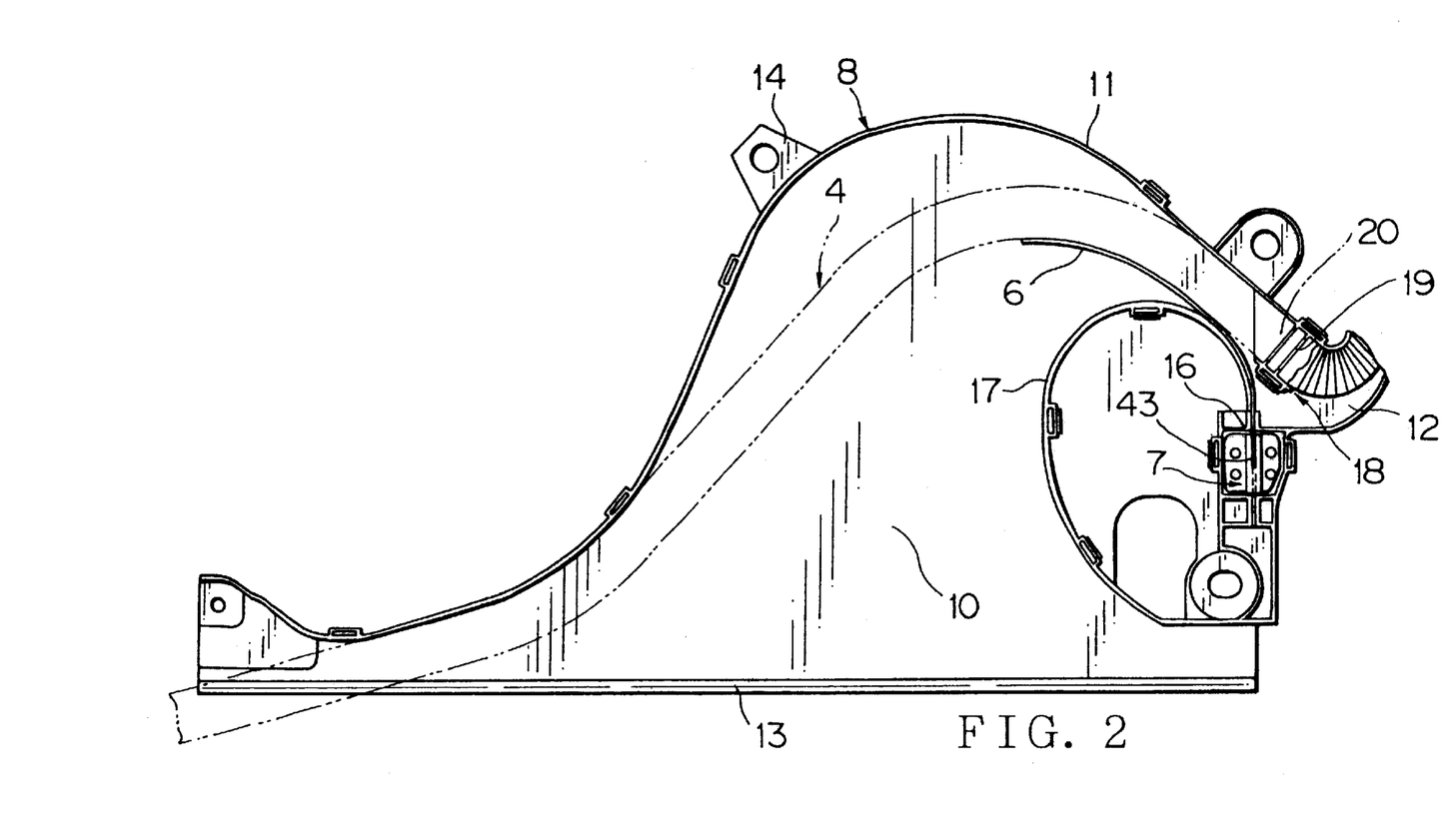
FIG. 2 is a front view of the harness slack absorbing apparatus of FIG. 1.

In the present embodiment, in order to prevent the resilient member 6 and the wire harness 4 from being bent too much, a flexure restraining wall 17 in a loop shape is provided below the resilient member 6. There is also provided a harness fixing part 18 near the first harness guide outlet 12, as shown in FIG. 2. By engaging a projecting rib 19 of the harness fixing part 18 with a groove in a corrugated tube 20 surrounding the wire harness 4 and made of synthetic resin, the wire harness 4 is fixed so as not to move in a longitudinal direction.

As shown in FIG. 1, a backward portion of the wire harness 4 is guided out of the second harness guide outlet 13 below the protector 5, and connected to a vehicle body wire harness 25 via a connector 24 which is fixed on a vertical back end wall 23 of a step 22 of a vehicle body 21. A forward portion of the wire harness 4 is guided upwardly from the first harness guide outlet 12 and connected to functional components (not shown) inside the sliding door 2 via a connector 26.

In FIG. 1, the sliding door 2 is in a closed position, and the wire harness 4 is pulled backward, while the resilient member 6 is pressed downward by the wire harness 4 to be flexed in a curved shape. Although the wire harness 4 tends to be slackened with opening movement of the sliding door 2, the resilient member 6 pushes the wire harness 4 upward to absorb the slack. In this manner, a catch of the wire harness 4 while the sliding door 2 is closed will be avoided. When the sliding door 2 is fully open, the protector 5 is positioned backward of the back end wall 23 of the step 22, and the wire harness 4 is pulled forward against the pressure of the resilient member 6 contracting in diameter into a loop shape. The resilient member 6 also contracts in diameter integrally with the wire harness 4. It is to be noted that the "forward and backward" directions in the description correspond to the front and the rear of the vehicle.

When the sliding door 2 is opened or closed, a tension in a longitudinal direction, i.e., withdrawing force is exerted on the resilient member 6 following the contraction of the wire harness 4. However, the resilient member 6 will not be disengaged from the protector 5, because the resilient member 6 is firmly fixed by the aforesaid fixing member 7.

Figure 3:
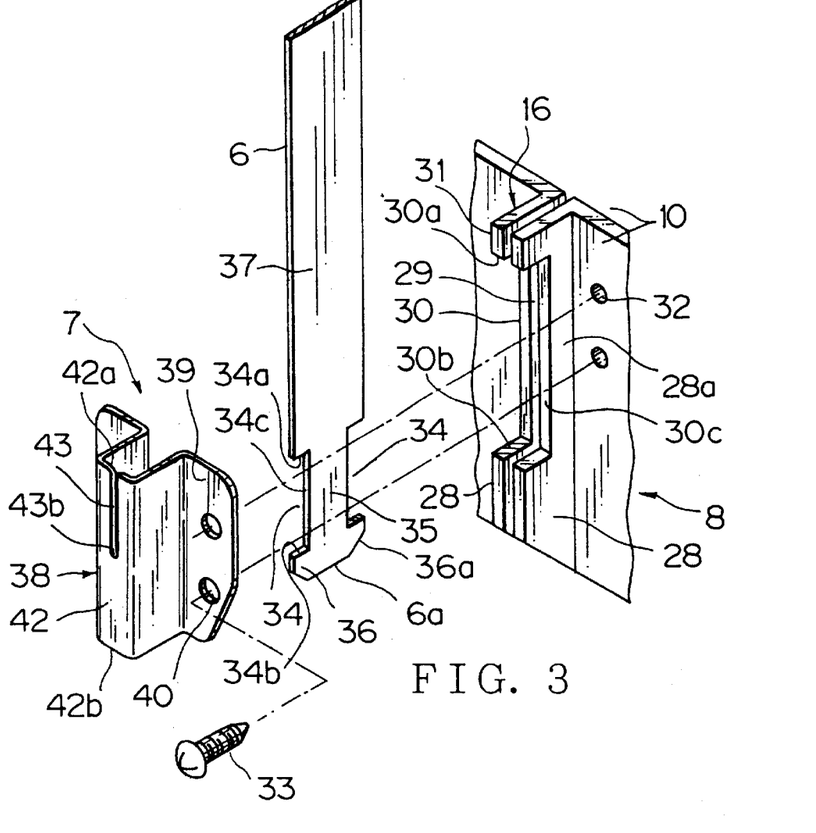
FIG. 3 is an exploded perspective view showing an embodiment of the harness slack absorbing structure according to the present invention.
Figure 4A:
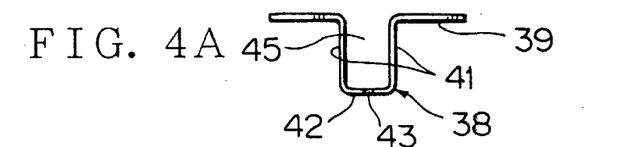
FIG. 4A is a plan view of a fixing member for a leaf spring.
Figure 4B:
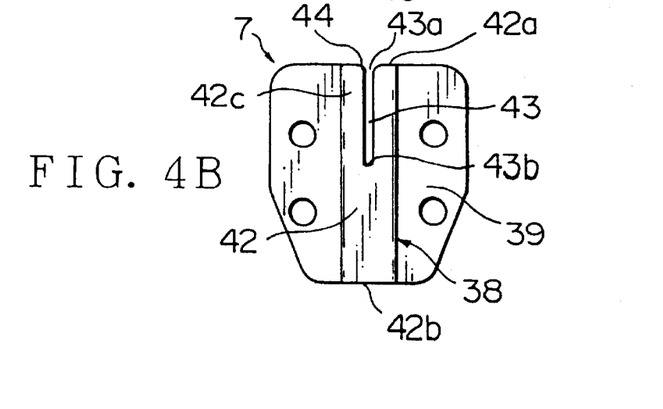
FIG. 4B is a front view of the fixing member of FIG. 4A.

Referring to FIGS. 3 and 4, an embodiment of the fixing member 7 will be described in detail. In FIG. 3, there are shown the insertion part 16 integrally provided on the base plate 10 of the protector body 8, the resilient member 6, and the fixing member 7 which is made of metal.

The insertion part 16 is composed of a pair of vertical walls 28 projected in a right angle from the base plate 10 which is made of synthetic resin, an insertion groove 29 formed between the walls 28, and rectangular cut-outs 30 formed in both the walls 28 at an intermediate position in a vertical direction.

A gap of the insertion groove 29 has a slightly larger width than a thickness of the resilient member 6. The walls 28 are respectively provided with projections 31 above the cut-outs 30, and lower edges 30a of the projections 31 (upper ends of the cut-outs 30) are in a horizontal position. In lower parts of the cut-outs 30, the walls 28 extend rather longer, and the insertion groove 29 is extended downward. Lower ends 30b of the cut-outs 30 are opposed to the upper ends 30a in parallel. Bottom ends 30c of the cut-outs 30 adjacent to narrow portions 28a of the walls 28 are vertically positioned. It is to be noted that a lower end of the insertion groove 29 may be closed with a bottom wall (not shown). In this case, a lower end 6a of the resilient member 6 may come into contact with the bottom wall of the insertion groove 29 to be positioned in a longitudinal direction.

A pair of upper and lower holes (tap holes) 32 for fixing the fixing member 7 to the base plate 10 are provided on each side of the cut-outs 30. In this embodiment, an area of the base plate 10 opposed to the fixing member 7 is formed to have a larger thickness for the purpose of securing screwing strokes for small screws 33.

In a base end portion of the resilient member 6, there are formed a pair of rectangular cut-outs 34 which are shorter in a vertical direction than the cut-outs 30 in the insertion part 16, symmetrically on both sides thereof. Upper ends 34a and lower ends 34b of the cut-outs 34 are opposed in parallel and positioned horizontally. Bottom ends 34c of the cut-outs 34 are positioned vertically, and a narrow part 35 is formed between both the cut-outs 34. A depth of the cut-out 34 is smaller than a width of the narrow part 35. A projection 36 is formed below the cut-outs 34, and a lower part of the projection 36 is tapered at 36a for preventing an interference when inserted. An area above the cut-outs 34 is continued to a broad part 37.

By providing the cut-outs 34 at both sides, it will be unnecessary to confirm the front and the back of the resilient member 6 in assembling, and the assembling work will be facilitated. In case where only one cut-out 34 is formed at one side, the side having the cut-out 34 must be opposed to the vehicle body 21 or the cover 9 in FIG. 1, when assembling, and the work would be annoying. In addition, by forming the vertical length of the cut-outs 34 smaller than that of the cut-outs 30 of the insertion part 16, the narrow part 35 has become shorter in length, thus increasing mechanical strength against tension or flexure of the resilient member 6. Accordingly, a risk of break down, fatigue failure, or plastic deformation of the resilient member 6 will be eliminated.

The fixing member 7 is produced by stamping a metal plate with a press and by bending it into a bracket shape. As shown in FIGS. 4A and 4B, a projected part 38 in a substantially U-shape in cross section is formed in a center part. Base plate parts 39 are integrally formed on both sides of the projected part 38 to be fixed to the base plate 10 of the protector body 8. There are formed holes 40 corresponding to the holes 32 for inserting the small screws.

The projected part 38 includes on both sides thereof rectangular walls 41 which are opposed to each other, and a central wall 42 connecting both the walls 41, as shown in FIG. 4A. At a center of an upper half portion of the connecting wall 42, there is formed in a vertical direction a straight slit 43 which is adapted to be engaged with the resilient member 6.

As shown in FIG. 4A, a space 45 for receiving the base end of the resilient member 6 and the insertion part 16 of the protector body 8 is defined inside the projected part 38. The slit 43 has a length of substantially a half of a vertical length of the projected part 38 and a width slightly larger than a thickness of the resilient member 6, enabling the resilient member 6 to be firmly held without a backlash in a direction of the thickness of the resilient member 6. An inlet 43a at an upper end of the slit 43 is provided with chamfered parts 44 for guiding insertion of the leaf spring (See FIG. 4B).

A lower end 43b of the slit 43 is adapted to get in contact with the upper end 34a of the cut-out 34 of the resilient member 6. A distance from the lower end 43b of the slit 43 to a lower end 42b of the connecting wall 42 is slightly shorter than a vertical length of the cut-out 34 of the resilient member 6. In a state where the upper end 34a of the cut-out 34 of the resilient member 6 is abutted against the lower end 43b of the slit 43, it is possible to bring the lower end 34b of the cut-out 34, in other words, the upper edge of the projection 36 of the resilient member 6 into contact with the lower end 42b of the connecting wall 42. A vertical length of the connecting wall 42 is slightly shorter than a length of the cut-outs 30 of the insertion part 16, and the connecting wall 42 can be engaged in the cut-outs 30.

Figure 5:
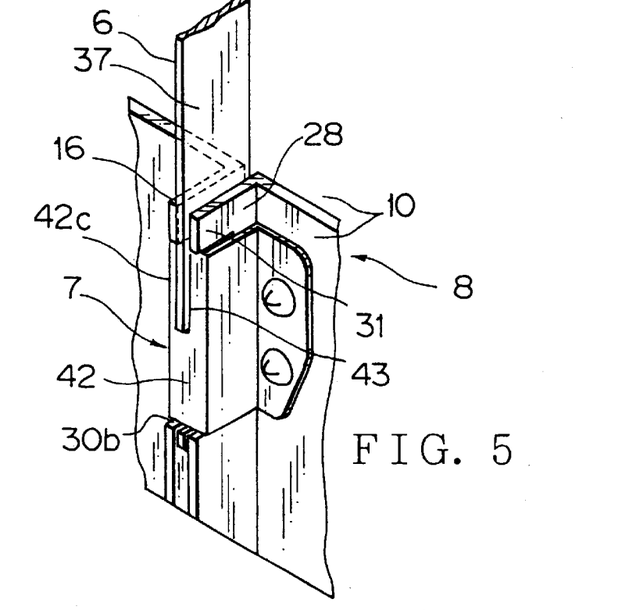
FIG. 5 is a perspective view of the harness slack absorbing structure in an assembled state.

As shown in FIG. 5, one side portion of the broad part 37 of the resilient member 6 above the cut-outs 34 enters into the slit 43 of the fixing member 7. On this occasion, the upper end 34a of the cut-out 34 is abutted against the lower end 43b of the slit 43, that is, an intermediate position of the connecting wall 42, and at the same time, the lower end 34b of the cut-out 34 is abutted against the lower end 42b of the connecting wall 42. While the resilient member 6 is inserted into the insertion part 16 of the protector body 8 and the connecting wall 42 of the fixing member 7 enters in the cut-outs 30 of the insertion part 16, an upper end 42a of the connecting wall 42 is abutted against the upper ends 30a of the cut-outs 30, that is, the lower end faces of the upper projections 31, and the lower end 42b of the connecting wall 42 is abutted against the lower ends 30b of the cut-outs 30.

In this state, a pair of the base plate parts 39 of the fixing member 7 are fastened to the base plate 10 of the protector body 8 by means of the small screws 33 or bolts. The holes 32 in the protector body need not be threaded, and the small screws 33 or the bolts are forcibly screwed into the holes 32.

As a first step for assembling, the cut-out 34 of the resilient member 6 is engaged with the fixing member 7, then, the fixing member 7 is engaged with the cut-outs 30 in the insertion part 16 of the protector body 8, and finally, the fixing member 7 is fixed to the base plate 10 by means of the screws. In an alternative way, the resilient member 6 is inserted into the insertion groove 29 in the insertion part 16 as a first step, then the fixing member 7 is engaged with the cut-out 34 of the resilient member 6 while the fixing member 7 is being engaged with the cut-outs 30 in the insertion part, and finally the fixing member 7 is fixed to the base plate 10 by means of the screws. These assembling steps are the same in other embodiments as will be described below.

In case where the insertion groove 29 has a bottom (not shown) to be abutted against a lower end 6a of the resilient member 6, the latter step is advantageous. On the other hand, in case where the insertion groove 29 is bottomless, the former step is advantageous. Particularly, because the slit 43 is provided in the fixing member 7, either step can be employed for assembling.

In FIG. 5, the resilient member 6 is preferably supported by the walls 28 including the projections 31 in the upper part of the insertion part 16 along its substantially entire width, and thus, the resilient member 6 will be smoothly flexed without torsion, resulting in an enhanced supporting strength of the insertion part 16. Even though fixing strength of the fixing member 7 by means of the screws 33 is rather weak, the projections 31 will strengthen the support of the resilient member 6, and the screws will be prevented from being loosen.

By engaging the broad part 37 of the resilient member 6 in the slit 43 of the fixing member 7, the resilient member 6 can be supported by both side areas or one of the side areas 42c of the slit 43 in a direction of thickness of the resilient member 6, and accordingly, in cooperation with the support by the insertion part 16, the supporting strength of the resilient member 6 will be further increased. The insertion part 16 made of synthetic resin will be thus prevented from deformation or breakage. The lower ends 30b of the cut-outs 30 in the insertion part 16 are useful for positioning the fixing member 7 when the fixing member 7 is fixed to the protector body 8, and assembling workability will be enhanced. Abutment of the lower end 42b of the fixing member 7 against the lower ends 30b of the cut-outs 30 will increase the supporting strength of the fixing member 7, and the fixing member 7 can fully withstand a pressure when the resilient member 6 expands from the flexed state enlarging its diameter.

Moreover, a vertical length of the cut-out 34 of the resilient member 6 can be decreased by provision of the slit 43 in the fixing member 7, as compared with a case where the slit 43 is not provided. As the results, rigidity, spring force and bending strength of the resilient member 6 will be increased, and tear or plastic deformation of the resilient member starting from the cut-outs 34 due to repeated use will be prevented.

The wire harness 4 (See FIG. 2) is arranged along a front face of the broad part 37 of the resilient member 6 in FIG. 5. Because the base end of the resilient member 6 has been rigidly fixed to the protector body 8, there will be no need of a cumbersome work that the base end of the resilient member 6 must be attached to the wire harness 4 which is round or oval in cross section to fix the resilient member, and thus, the assembling work will be facilitated. Moreover, once the base end of the resilient member 6 has been fixed, the wire harness 4 can be easily extended along the resilient member 6, and accordingly, such a work as fixing the wire harness 4 to the distal end of the resilient member 6 by means of a tape or band, for example, can be easily conducted.

Further, even when the wire harness 4 is strongly tightened at the opening and closing movements of the sliding door 2 and the resilient member 6 is subjected to a strong force in a tensile direction through friction against the wire harness 4, a withdrawal of the resilient member 6 will be prevented, because the base end of the resilient member 6 has been rigidly fixed. Accordingly, absorption of a slack of the wire harness 4 can be reliably performed, and a bite of the wire harness 4 between the sliding door 2 and the vehicle body 21 can be reliably prevented.

In FIG. 3, the bolts may be inserted into the holes 32 from a back of the base plate 10 and passed through the holes 40 in the fixing member 7 to be fastened by means of nuts (not shown) in front of the fixing member 7, or alternatively, the bolts may be screwed into weld nuts (not shown) provided on the fixing member 7 and fastened.

Figure 6:
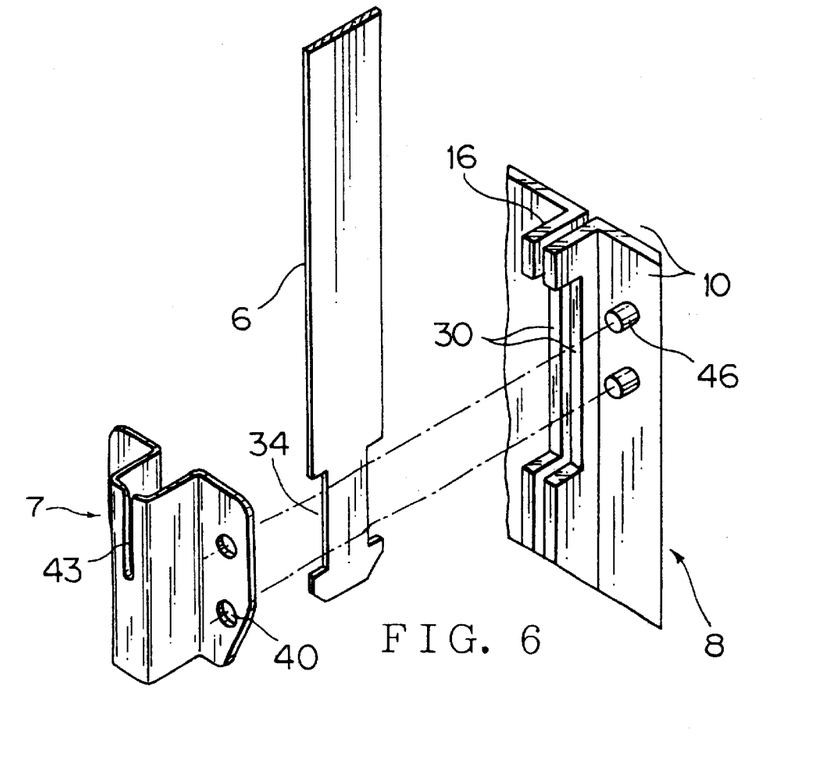
FIG. 6 is an exploded perspective view showing another embodiment of the harness slack absorbing structure according to the present invention.

FIG. 6 shows another embodiment of the present invention. In this embodiment, the fixing member 7 is fixed to the base plate 10 of the protector body 8 by means of fusible projections 46 in a short columnar shape which are integrally formed on the base plate 10 made of synthetic resin. After the projections 46 have been inserted into the holes 40 in the fixing member 7, tip ends of the projections 46 may be pressed and deformed with a hot press or the like, or fused by means of a laser, so that the fixing member 7 can be fixed to the protector body 8.

A plurality of the projections 46 can be crushed and deformed at a time with the hot press or the like.

Alternatively, the tip ends of the projections 46 may be integrally provided with locking clips or hooks (not shown), with which the fixing member 7 can be detachably locked.

By employing such fixing methods and structures, cost for components such as the small screws and bolts can be saved, and cumbersome screwing works will be unnecessary. Thus, the structure will be simplified and the cost will be reduced. In addition, as compared with the embodiment in FIG. 3, the base plate 10 of the protector body 8 can be thin-walled, because a heavy screwing stroke is not required, and therefore, the structure can be made compact and lightweighted.

In FIG. 6, the structure except the projections 46 is the same as in FIG. 3, and so, the same elements are denoted with the same reference numerals and their explanation will be omitted.

Figure 7:
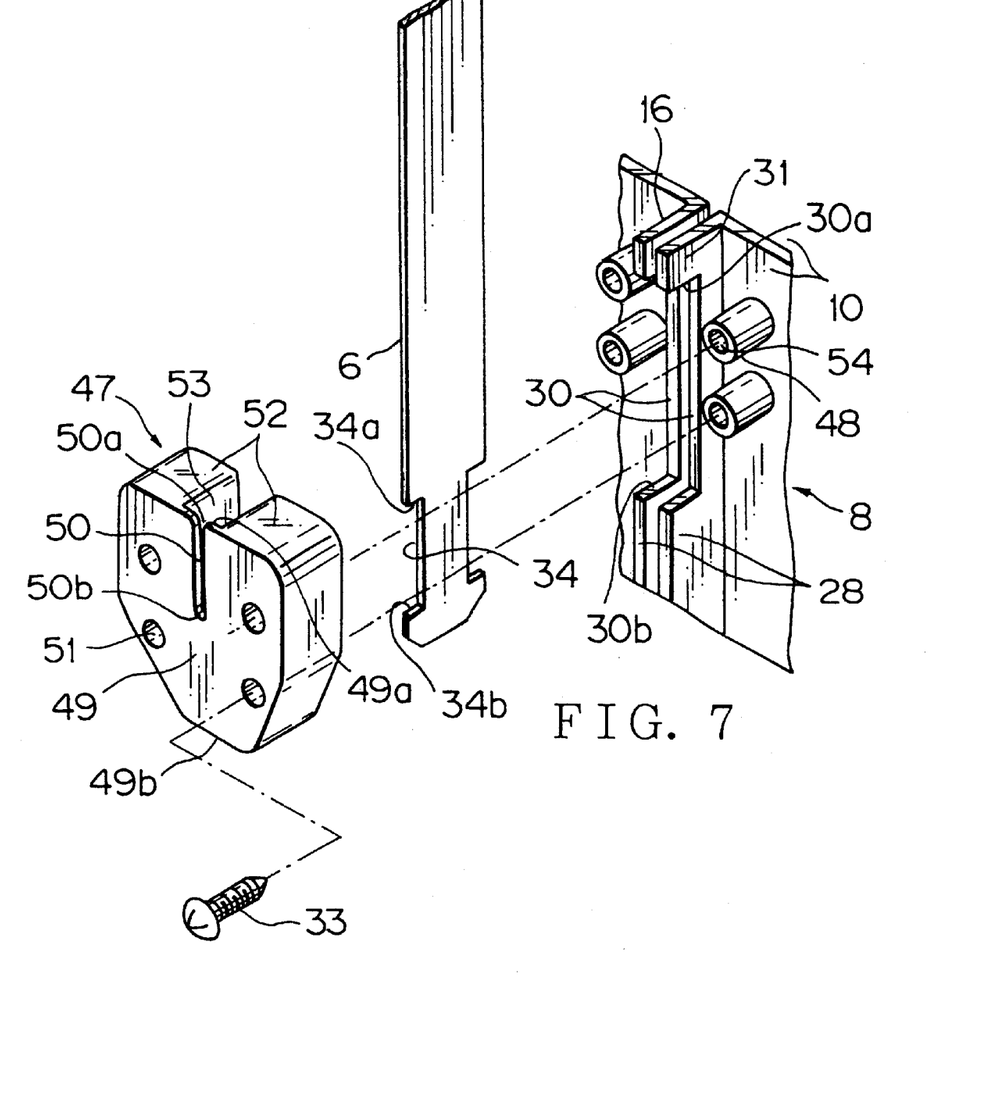
FIG. 7 is an exploded perspective view showing still another embodiment of the harness slack absorbing structure according to the present invention.

FIG. 7 shows still another embodiment of the present invention. In this embodiment, a fixing member 47 is formed of synthetic resin. The fixing member 47 is fixed to the cylindrical projections 48 of the protector body 8 by screw fitting. The resilient member 6 and the insertion part of the protector body 8 are the same as in the embodiment of FIG. 3, and denoted with the same reference numerals.

The fixing member 47 is molded by means of resin forming molds (not shown). The fixing member 47 is composed of a front base plate 49, a slit 50 formed in a center of an upper half area of the base plate 49 and adapted to be engaged with the resilient member 6 fixing holes 51 provided in the base plate 49 in both-side areas of the slit 50, and a pair of solid box-like parts 52 which are integrally formed in rear of the base plate 49. The holes 51 pass through the box-like parts 52.

There is formed a space 53 in a shape of a groove between a pair of the box-like parts 52 in such a manner that the insertion part 16 of the protector body 8 can be inserted therein. The slit 50 communicates with the space 53 and is positioned in a center of the space 53. A back face of the base plate 49 is opposed to a bottom of the space 53, and an upper end 49a of the base plate 49 is exposed by a width of the space 53 at an upper inlet 50a of the slit 50.

One side of the resilient member 6 is inserted into the slit 50 in such a manner that the upper end 34a of the cut-out 34 of the resilient member 6 is abutted against a lower end 50b of the slit 50 and the lower end 34b of the cut-out 34 is abutted against a lower end 49b of the base plate 49. In this manner, the resilient member 6 is positioned with respect to the fixing member 47, and the position of the resilient member 6 both in a longitudinal direction and in a direction of its thickness can be determined.

In the box-like parts 52 in the back, there are formed spaces (not shown) for receiving cylindrical projections 48 of the protector body 8. A depth of the box-like parts 52 is equal to a length of the projections 48. Two each of the projections 48 are arranged on both sides of the cut-outs 30 in the walls 28 of the insertion part 16. An inner diameter of the cylindrical projection 48 is smaller than an outer diameter of threads of screw means such as the small screw 33 or bolt so that the small screw 33 may be forcibly screwed into a bore 54 inside the projection 48.

Screwing of the small screws is conducted, after the resilient member 6 has been inserted into the insertion part 16 and the position of the resilient member 6 has been determined by the fixing member 47, in a state where the base plate 49 of the fixing member 47 has been engaged with the cut-outs 30 in the insertion part 16. Because the upper end 49a of the base plate 49, that is, both side areas of the inlet 50a of the slit 50 is abutted against the upper ends 30a of the cut-outs 30, that is, the lower edges of the upper projections 31, and the lower end 49b of the base plate 49 is abutted against a stepped part, that is, the lower ends 30b of the cut-outs 30, the fixing member 47 can be positioned with respect to the protector body 8. On the other hand, it is also possible to fix the fixing member 47 to the protector body 8 by screw fitting, by first engaging the resilient member 6 with the fixing member 47, and then, engaging the fixing member 47 with the cut-outs 30 in the insertion part.

By engaging the fixing member 47 carrying the resilient member 6 fixed thereto, with the cut-outs 30 in the insertion part, the fixing member 47 can be firmly fixed to the protector body 8 against tensile force and bending force of the resilient member 6. Moreover, because the projections 48 for the screws are projected so as to get in contact with the back face of the base plate 49, screw tightening strength, in other words, fixing strength of the fixing member 47 can be enhanced.

In place of the cylindrical projections 48, the columnar solid projections 46 as shown in FIG. 6 may be provided so as to pass through the holes 51 in the fixing member 47, and the tip ends of the projections 46 may be thermally deformed to fix the fixing member 47 to the protector body 8. Alternatively, the cylindrical projections 48 may be provided on the back face of the base plate 49 or the box-like parts 52 of the fixing member 47, and the small screws may be screwed from the back face of the base plate 10 of the protector body 8. It is also possible to form the fixing member 7 in a substantially same shape as in FIG. 3 by resin molding, and to pass the small screws 33 through the holes 40 to directly screw them into the holes 32 in the protector body 8.

Further, the fixing member 7 may be inclined backward or forward in FIG. 2, so that the slit 43 may be positioned in an inclined manner backward or forward instead of vertically. Still further, the resilient member 6 may be composed of not only a sheet of leaf spring but also two sheets of the leaf springs piled on each other. Alternatively, the two sheets of the leaf springs may be arranged above and below the wire harness 4. Only the base end of the resilient member 6 may be in a plate-like shape, while the distal end portion and the intermediate portion of the resilient member 6 may be in a rod-like shape.

Referring to FIG. 3, if the cut-out 34 is formed up to a half of the width of the resilient member 6, the center part of the resilient member 6 but not one side only can be engaged in the slit 43 of the fixing member 7. In this manner, the resilient member 6 can be supported without torsion even though the upper projections 31 of the insertion part 16 are not provided.

It is also possible to arrange the protector 5 horizontally in the vehicle body 21, for example, under the step 22, but not on the sliding door 2. Further, the protector 5 may be composed of the protector body 8 only, and a door trim (not shown) or the door inner panel 3 may be used in place of the cover 9.

Although the present invention has been fully described by way of examples with reference to the accompanying drawings, it is to be noted that various changes and modifications can be made within the scope of the present invention.

What is claimed is:

1. A harness slack absorbing structure comprising a resilient member in a plate-like shape whose base end is fixed to a protector body by means of a fixing member, and a wire harness installed along said resilient member, said resilient member being provided at a base end portion with a cut-out, said fixing member being provided with a slit for engagement with said resilient member, wherein one end of said cut-out is abutted against a lower end of said slit, while the other end of said cut-out is abutted against a base end of said fixing member.

2. The harness slack absorbing structure as claimed in claim 1, wherein said cut-out is provided on either side or both sides in a lateral direction of said resilient member.

3. The harness slack absorbing structure as claimed in claim 1 or 2, wherein said protector body includes an insertion part for receiving said resilient member, said insertion part being provided with a cut-out for engagement with said fixing member.

4. The harness slack absorbing structure as claimed in claim 1 or claim 2, wherein said fixing member is fixed to said protector body by screw means.

5. The harness slack absorbing structure as claimed in claim 1 or 2, wherein said fixing member is fixed to said protector body through thermal deformation of projections which are formed of synthetic resin and provided on either of said protector body and said fixing member.

6. The harness slack absorbing structure as claimed in claim 1 or claim 2, wherein said protector body includes a protector for receiving said wire harness in a curved state, said protector body being provided in a sliding door or a vehicle body.

* * * * *